(12) United States Patent
Ben-Schachar et al.

(10) Patent No.: US 7,633,483 B2
(45) Date of Patent: Dec. 15, 2009

(54) DISPLAY EXTENSION USING TERMINAL CLIENTS

(75) Inventors: Ido M. Ben-Schachar, Kirkland, WA (US); Robert-Wilhelm Schmieder, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 700 days.

(21) Appl. No.: 11/426,750

(22) Filed: Jun. 27, 2006

(65) Prior Publication Data

US 2007/0296643 A1 Dec. 27, 2007

(51) Int. Cl.
*G06F 13/38* (2006.01)
(52) U.S. Cl. .......................... 345/100; 345/1.1; 345/2.1; 345/1.3; 345/619; 345/649; 345/650; 345/651; 345/652; 345/3.1; 345/660; 719/329
(58) Field of Classification Search ................. 345/116, 345/522, 136, 332, 433, 1.1, 2.1; 395/826, 395/135, 200.04, 329, 522, 502, 110, 856, 395/888; 358/452; 704/3
See application file for complete search history.

(56) References Cited

U.S. PATENT DOCUMENTS 5,864,711 A * 1/1999 Mairs et al. .................... 710/6
6,008,804 A * 12/1999 Pommier et al. ............ 715/753
6,091,408 A * 7/2000 Treibitz et al. .............. 715/753
7,356,563 B1 * 4/2008 Leichtling et al. .......... 709/204

* cited by examiner

Primary Examiner—Richard Hjerpe
Assistant Examiner—Olga Merkoulova
(74) Attorney, Agent, or Firm—Workman Nydegger

(57) ABSTRACT

Extending graphical information to a remote computing system such that a multiple monitor configuration can be implemented for the first computing device is illustrated. The multiple monitors include a display connected to the first computing device and one or more displays connected to other computing devices. A remote session is established between the first computing device and the second computing device. Graphics commands are generated for first and second display drivers at the first computing device as if a multi-display configuration is active at the first computing device. The first display driver is associated with a display at the first computing device. The second display driver doesn't have an associated display at the first computing device. Graphics are displayed from the graphics commands for the first display driver at the display at the first computing device. Graphics commands for the second display driver are remoted to the second computing device.

20 Claims, 4 Drawing Sheets

DISPLAY EXTENSION USING TERMINAL CLIENTS

BACKGROUND

Background and Relevant Art

Computers and computing systems have affected nearly every aspect of modern living. Computers are generally involved in work, recreation, healthcare, transportation, entertainment, household management, etc. In fact, nearly every task performed in an office environment involves data entry or retrieving data from a personal computer system. For example, documents are generated using word processing applications. Scheduling day to day tasks are coordinated through a calendar program. Many communications take place using electronic mail services which are accessed using an electronic mail client. Instant communications can take place by using instant message clients for sending quick text or even video messages.

In today's multitasking environments, computer users will often use a number of applications or desire to have a number of applications available for use at any given time. For example, a user may wish to generate a document using a word processing application while also waiting for notification that an electronic mail message has been received. In an another example, a user may wish to reference a document displayed using a pickled document viewer such as Adobe Viewer while creating a document using a word processing program such as Microsoft Word.

As more and more tasks are performed using a single desktop computer, the computer display can become cluttered because of the number of applications open for use at any given time. Additionally, with the limited available desktop space, a user may need to place application windows on top of one another with the currently used application window at the forefront of the display to facilitate the applications use. The limited size of the display limits the amount of information that can be displayed at any given time. As can be imagined, it would be more convenient in some applications to allow for more display space. For example, in the example described above where a user references a document while creating a different document in a different application, the user may wish to have both applications available for use simultaneously as the document being created may have need to include information from the referenced document.

One method of allowing for more display space to simultaneously display different application windows is by changing the hardware configuration of the computer running the applications. For example, if the computer is a desktop computer an additional monitor display may be added by adding an additional video card or a video card that supports multiple displays and by connecting an additional display to the video card. Adding additional displays and computer hardware, of course comes with an actual monetary cost associated with acquiring the displays and hardware.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment may be practiced, for example, in a computing environment including a number of computing devices including displays. A method of extending the desktop from a first computing device onto a display of a second computing device such that a multiple monitor configuration can be implemented for the first computing device is illustrated. The multiple monitors include a display connected to the first computing device and one or more displays connected to other computing devices. The method includes establishing a remote session between the first computing device and the second computing device. A remote session may include a session of two computing devices that are in close proximity. Graphics commands are generated for first and second display drivers at the first computing device as if a multi-display configuration was active at the first computing device. Display drivers ordinarily correspond to a particular monitor display. In other words, each monitor typically is associated with each its own display driver. The first display driver is associated with a display at the first computing device. The second display driver does not have an associated display at the first computing device. Graphics are displayed from the graphics commands for the first display driver at the display at the first computing device. Graphics commands for the second display driver are remoted to the second computing device.

In another embodiment, a method includes establishing a remote session between the first computing device and the second computing device. The remote session may include a session of two computing devices that are in close proximity. Graphics commands are received for a dummy display driver at the second computing device. The dummy display driver does not have an associated display at the first computing device. Graphics from the graphics commands for the dummy display driver are displayed at the display at the second computing device.

In another embodiment, a method includes displaying a graphical user interface at a first computing device. The graphical user interface includes one or more user selectable elements allowing a user to indicate a desire to establish a remote session for extending graphics information to a display on a second computing device. User input is received at the one or more user selectable elements indicating that the user desires to establish a remote session. In response to user input, a remote session between the first computing device and the second computing device, including instantiating a dummy display driver for the second computing device, is established. No display at the first computing device is associated with the dummy display driver. Graphical information corresponding to the dummy display driver is remoted to the second computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
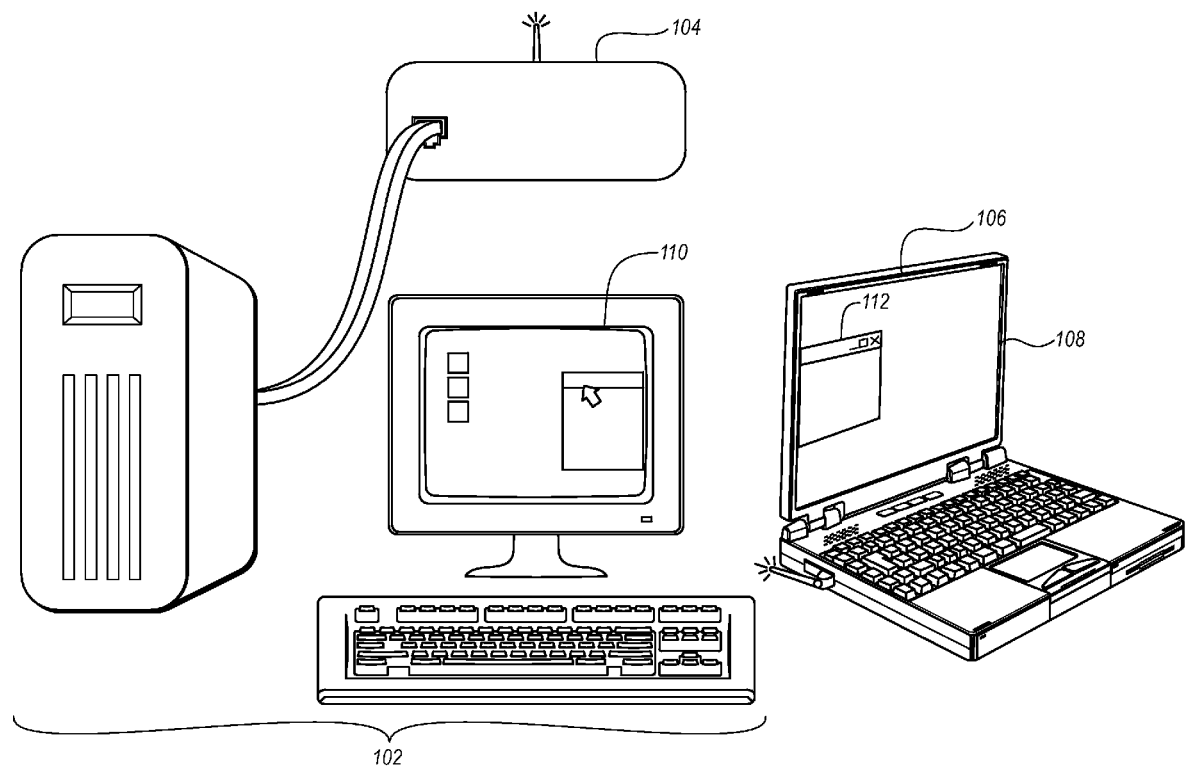
FIG. 1 illustrates computing devices and a configuration that may be used to remote graphics information from one computing device to another.

Embodiments herein may comprise a special purpose or general-purpose computer including various computer hardware, as discussed in greater detail below.

Often, computer users have a number of different computing devices. For example, a user may often own a desktop computer, a laptop computer, a PDA, and/or other computing devices. Some embodiments herein allow screen space on the computing devices to be leveraged such that one computing device can use the screen space of displays on other computing devices. For example, a desktop computer may have its own display available for displaying application windows. The desktop computer may be configured with multiple display support where a second display for the desktop computer is the display of a laptop computer, or other computing device placed in close proximity to the desktop computer. This may be accomplished by using terminal services where the desktop acts as a terminal server and the laptop acts as a terminal client.

Notably, terminal services may be used in a number of various scenarios. For example, in one scenario described in more detail below, a terminal server hosts sessions for a number of clients and remotes all graphics for a session to the client for that session. Graphics are only actually displayed at the client as the server may actually be hosting a number of sessions. In an alternative scenario, the terminal server technology is used to remote the graphics that are actually being displayed at the server to a client where they are also displayed. This is sometimes referred to as a remote assistance scenario because the graphics that are displayed on the local monitor of the host/server are remoted to a client. This scenario is used for example when an administrator at a remote client is providing remote assistance to a user. In the embodiments described herein, functionality similar to the second scenario, i.e. the remote assistance scenario, are used. Specifically, a dummy display driver is set up at the terminal server along with a local display driver. While graphics are generated for the dummy display driver, they are not displayed at the terminal server. Rather, the graphics for the dummy display driver are discarded locally, but remoted to the terminal client where they can be displayed on a monitor. The local display driver is used to display graphics to a local display.

As described above, one example of the functionality provided by networked computers relates to the ability to provide terminal services from a server computer. These types of services may also be referred to as an application server. A terminal server may provide computing functionality to one or more terminal clients. In this example, terminal clients connect to a terminal server where the terminal server is able to provide computing power for executing applications and performing other computing functions requested at the terminal clients. In this fashion, the processing power of a terminal server can be leveraged such that several terminal clients can utilize the processing power of the terminal server. A powerful terminal server can provide computing functionality to 100s of clients simultaneously. This functionality can also be used to implement sessions where any client that connects to the terminal server is in a session that displays what is displayed at the terminal server. In applications described herein, the terminal client is leveraged to extend the display space of the terminal server by extending the display of the terminal server by remoting graphics for a dummy display driver onto the terminal client.

Referring now to FIG. 1, one illustrative example of one embodiment is illustrated. In the example illustrated, a desktop computer 102 is shown. The desktop computer 102, may include some of the functionality included in terminal server applications, or remote desktop applications. The desktop computer is connected in a network via a router 104. In this example, the router 104 includes both wired and wireless capabilities. The wired capabilities may include the ability to connect via an appropriate wired network connection protocol such as Ethernet or other appropriate protocol. The wireless capabilities may include functionality for connecting via an appropriate wireless protocol such as IEEE 802.11a, b, or g, commonly referred to as Wi-Fi, or any other appropriate wireless protocol.

FIG. 1 further illustrates a laptop computer 106 connected to the router 104 through a wireless connection. Notably, the laptop computer 106 may be connected using wired connections as well. In this example, the laptop computer 106 has terminal client software installed on it. Using the laptop 106 as a terminal client to the terminal server on the desktop computer 102 allows the display 108 of the laptop 104 to function as an extension of the display 110 of the desktop computer 102. In particular, FIG. 1 illustrates a window 112 being dragged from the desktop display 110 to the laptop display 108.

Figure 2:
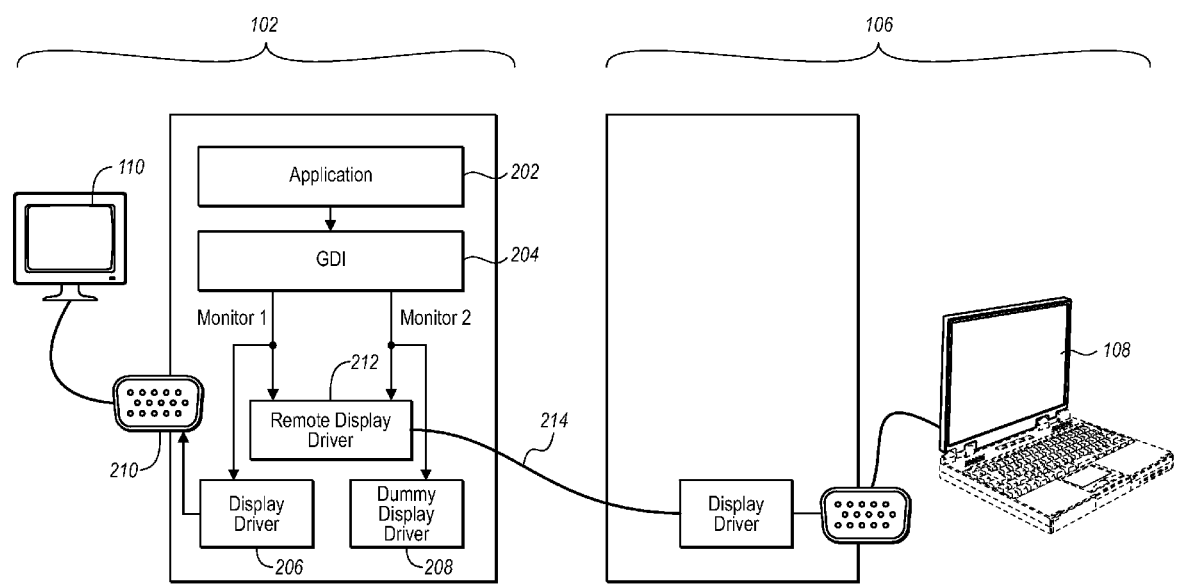
FIG. 2 illustrates block diagram elements of the computing devices illustrated in FIG. 1.

Referring now to FIG. 2, additional details are illustrated. The details illustrated in FIG. 2 illustrate how one embodiment implements the display extension using a terminal server. FIG. 2 illustrates the desktop computer 102, which acts as a terminal server. FIG. 2 also illustrates the laptop 106 which functions as a terminal client. Referring now to the desktop computer 102, the desktop computer has stored thereon an application 202. The application 202 may be programmatic code stored in one or more memory locations that is executable by a processor on the desktop computer 102. The application 202 is capable of outputting graphics commands to a graphics device interface (GDI) 204. The GDI 204 outputs graphics commands to display drivers. In the example shown in FIG. 2, the desktop computer 102 includes a local display driver 206 and a dummy display driver 208. The local display driver 206 is connected to local video hardware 210 such as a local video adapter. The local video hardware 210 may be connected to the display 110. Thus, the application 202 can display graphics information on the display 110 by sending drawing commands to the GDI 204 which sends commands to the display driver 206 which sends graphical information to the local video hardware 210 which sends graphical information to the display 110.

FIG. 2 also illustrates a dummy display driver 208. The dummy display driver 208 may be implemented in a number of different ways as will be explained in more detail below. Suffice it to say however, the dummy display driver 208 serves as a mechanism for indicating to the desktop computer 102 that multiple displays are attached to the desktop computer 102 in spite of the fact that only a single display 110 is attached to the desktop computer 102. In one embodiment, the dummy display driver 208 may be instantiated by installing additional video hardware such as a video adapter to the desktop computer 102 and simply not attaching a display to the additional hardware. The desktop computer 102 could then be configured to send video commands to the new video hardware in spite of the fact that no display is actually connected to the new video hardware. In an alternative embodiment, the desktop computer 102 may simply have a dummy display driver 208 instantiated on the desktop computer 102 without any video hardware actually being installed on the desktop computer 102. This could be implemented by designing a display driver that did not require associated hardware for the display driver to be instantiated. In one embodiment, the dummy display driver 208 will simply discard any drawing commands sent to it.

In the example illustrated in FIG. 2, a terminal services session is created between the desktop computer 102 and the laptop computer 106. The terminal server includes a remote display driver 212. The remote display driver 212 receives drawing commands from the GDI 204. In one embodiment, the remote display driver 212 is a mirror display driver that intercepts commands from the GDI 204 to the display drivers 206 and 208. As such GDI 204 provides graphics at the same time to the local display driver 206, the dummy display driver 208 and the remote display driver 212. The remote display driver 212 then sends the graphical commands to the laptop computer 106 as illustrated by the connection 214 where the graphical commands can be displayed on the display 108 of the laptop computer 106. The connection 214 may be a remote graphics protocol such as Remote Desktop Protocol (RDP). Notably, the remote display driver 212 is generally instantiated when a terminal client connects to a terminal server. As such, in the example illustrated, generally the remote display driver 212 does not receive graphics commands until the laptop computer 106 establishes a session with the desktop computer 102. As illustrated in FIG. 2, in one embodiment the remote display driver 212 may send graphical commands for both the display driver 206 and the dummy display driver 208. At the laptop computer 106, the laptop computer can be configured to zoom in on the portion of the rendered graphics corresponding to the display commands sent to the dummy display driver 208 such that the rendered graphics corresponding to the dummy display driver 208 are displayed on the laptop display 108. In an alternative embodiment, a selection may be performed at the desktop computer 102 specifying which graphics commands to send to the laptop computer 106. As such, in one embodiment, only the graphics commands corresponding to the dummy display driver 208 may be sent to the laptop computer 106.

Illustrating now further details, embodiments may be practiced by using server products such as Windows Server 2003 from Microsoft Corporation of Redmond Wash. Windows Server 2003 includes terminal server applications appropriately named Terminal Services. In one embodiment, Terminal Services includes a number of different modes of operation. One particular mode that can be used to implement embodiments described herein is console shadow mode. Console shadow mode allows a terminal client to see what is on the screen of the terminal server. Other modes can also be implemented. For example, modes may be developed where a user is able to share one or more screens. APIs may be implemented to allow a user at a server application to share graphics information intended for one or more display drivers. These modes may be referred to herein as screen sharing modes or collaboration modes. In particular, these modes may be used in applications other than display extension to facilitate collaboration on a project or for remote assistance functionality. By having one of the display drivers be a dummy display driver not associated with any actual monitor display at the server computer, and remoting the graphics information intended for the dummy display driver to another computing device, display extension onto the other computing device can be accomplished.

With reference to FIG. 2, when the using the console shadow mode, which may implement a mirrored display driver as the remote display driver 212, typically the graphics information sent to the terminal client, in this case the laptop 106, is a stitched together version of the graphics information intended for the local display driver 206 and the dummy display driver 208. In other words, the graphics are generally sent as commands for a single display in spite of the fact that the graphics include information intended for two displayer drivers 206 and 208 indented for two different displays. As such, in console shadow mode, the graphics information is of a size and resolution that is likely too big to be displayed on the laptop display 108. To remedy this, the laptop computer 106, as the terminal client, may be modified to zoom to a particular portion of the graphics information. In particular, the laptop computer may be modified to zoom to the portion of the graphics information corresponding to the graphics commands issued to the dummy display driver 208.

Zooming to the portion of the display corresponding to the dummy display driver may be accomplished in a number of different ways. Specifically, mechanisms should be used to facilitate the laptop computer 106 determining which portions of the graphics correspond to the dummy display driver. In one embodiment, a portion of establishing a session between the desktop computer 102 and the laptop computer 106 includes an exchange of resolution information. This exchange is generally not a part of an existing remote graphics protocol such as RDP and thus is generally either part of an extended remote graphics protocol, or alternatively may be sent out of band using a different protocol. In particular, the laptop computer 106 may provide a message to desktop computer indicating the resolution and color depth of the laptop display 108. This information can then be used by the desktop computer 102 to configure the dummy display driver 208. The resolution can then be used by the desktop computer 102 to set the dimensions reported by the dummy display driver to upper layers. In particular, the dummy display driver is configured to render graphics information within the constraints of the resolution and color depth of the laptop display 108.

With respect to color depth, in the console shadow mode, the concatenated screen, i.e. the stitched version of graphics for the local display driver 206 and the dummy display driver 208, only a single color depth is used. Generally, the color depth used is the minimum of any of the color depths for any of the display drivers, both real and dummy.

The desktop computer 102 may provide a number of different pieces of resolution information to the laptop computer 106. For example, the desktop computer 102 may provide information indicating which portions of the graphics information sent from the desktop computer 102 correspond to the dummy display driver 208. Alternatively, or in addition, the desktop computer may provide information indicating which portions of the graphics information correspond to the local display driver 206. This information may be sent using an extended graphics protocol or out of band. Using one or more pieces of this information, the laptop computer 106 can determine which portions of the graphics information to zoom to to display the graphics information corresponding to the dummy display driver 208. Notably, this information may only be needed when all of the display information for all display drivers is sent to the laptop computer 106. In embodiments where only information for a single display driver is sent, there is no need to send all of the additional information.

In summary, using the shadow functionality, a "mirror" driver is attached at the desktop computer 102 in the form of the remote display driver 212. The mirror driver (remote display driver 212) will receive all of the drawing commands for the desktop computer 102 desktop. The drawing commands are then encoded by a server component in the desktop using a remote graphics protocol such as RDP and sent to the laptop computer 106. In this embodiment, all of the desktop computer 102 desktop information is sent, and the laptop computer 106 includes functionality for zooming to the appropriate portion of the desktop graphics information. As will be explained in more detail below in an alternative embodiment, the mirror driver (remote display driver 212) may be only attached to the dummy display driver 208, or only configured to send graphics information from the dummy display driver 208 using the server component. Thus, in this alternative embodiment, only the extended portion of the desktop computer 102 desktop is sent as opposed to the entire desktop computer 102 desktop.

In embodiments using the console shadowing functionality of the terminal server, several enhancements may be implemented. For example, typically the shadowing functionality specifies warnings that will be displayed when a shadowing session is instantiated. In one embodiment, these warnings may be disabled so as to create a more seamless system.

In the alternative embodiment mentioned above, a collaboration type session may be used to implement the functionality for extending a display to a terminal client display. The collaboration session example is similar to the console shadowing example described previously. However, the collaboration session and collaboration functionality in general may include functionality for specifying a display to use for collaboration. For example, the desktop computer 102 may begin a collaboration session with the laptop computer 106. Graphics commands for both the local display driver 206 and the dummy display driver 208 may be sent to the remote display driver 212. However, associated with the collaboration session, the desktop computer 102 may be configured to only share the graphics information corresponding to the dummy display driver 208. Thus, the remote display driver 212 only sends the graphics information related to the dummy display driver 208 to the laptop computer 106. This particular embodiment has a number of advantages. For example, by only sending some of the display information, i.e. the display information corresponding to the dummy display driver 208, network bandwidth between the desktop computer 102 and a laptop computer 106 can be conserved. Additionally, the laptop computer 106 does not need additional configuration for zooming in on the appropriate graphics data as with the console shadow session.

Various factors should be taken into account when establishing a session, whether the session is a shadow session or a collaboration session between the desktop computer 102 and the laptop computer 106. For example, various factors should be taken into account to determine when to create a session between the desktop computer 102 and a laptop computer 106 for extending display information from the desktop computer 102 to the laptop computer 106. Additionally, various security precautions should be taken to ensure that unauthorized computers do not inappropriately establish a session for extending the display and thus have the ability to intercept confidential information.

While in the example above, the laptop computer 106 (or client computer) may initiate the connection with the desktop computer 102, in alternative embodiments, the desktop computer 102 (or server computer) may initiate the connection to the laptop computer 106. This could be used, in one embodiment, to reduce some security risks and concerns because the connection is initiated by the server computer that includes the resources that should be protected against attack. Additionally, by having a server connect to a client when remoting display extensions, a seamless integration can be facilitated for the display control panel applet of the client. Specifically, the user will not have to enter code on the client computing device.

One factor that should be taken into account in determining whether not to establish a session between a desktop computer 102 and the laptop computer 106 is the proximity of the laptop computer 106 to the desktop computer 102. Illustratively, if the laptop computer 106 is not in close proximity to the desktop computer 102, it may be difficult to use the laptop computer 106 as an extension for display information from the desktop computer 102. Thus, some embodiments described herein include functionality for determining that the laptop computer is in close proximity to the desktop computer 102.

In one embodiment, proximity may be established by a determination that the desktop computer 102 and a laptop computer 106 are on the same subnet. Thus for example, if a user uses the laptop computer 106 in a work environment on a different network than the desktop computer 102, the user will ordinarily want to utilize the laptop computer 106 as its own computing device. However, when the user relocates the laptop computer 106 from a work environment to a different environment which includes the desktop computer 102, the desktop computer 102 and the laptop computer 106 may be on the same network or subnet. This may be used as an indication that the laptop computer 106 is to be used as an extension for the display information generated at the desktop computer 102. However, this embodiment may not always function for all environments. For example, some organizations have separate subnets for wired and wireless connections.

In an alternative example, proximity may be determined by using other wireless or wired connections and protocols. For example, in one embodiment wireless Bluetooth adapters may be used to indicate that the desktop computer 102 and a laptop computer 106 are in close proximity. In particular, Bluetooth specifications define various limits and proximities for operation. Generally, Bluetooth enabled devices are intended to function only within certain proximities. As such, the Bluetooth radio is a low-power radio. Thus, in one embodiment, a session for extending display capabilities will only be created if the desktop computer 102 and laptop computer 106 are able to establish a wireless Bluetooth or other similar connection.

Other examples may also allow proximity to be determined by the emission of signals from one of the computers to the other that requires close proximity for the signals to be received. For example, the desktop computer 102 may emit a tone from the speaker of the desktop computer 102. The laptop computer 106 may sense the tone through the microphone of the laptop computer 106. The ability of the laptop computer 106 to sense the tone is an indication that the laptop computer 106 has in a proximity that is near to the desktop computer 102 such that a session for extending the display of the desktop computer 102 can be established. Additionally in one embodiment, the strength of the tone may be further used as an indication of the relative proximity of the laptop computer 106 to the desktop computer.

In any case, whatever signal is used, whether the signal be Bluetooth, a tone, or some other signal, other actions may be used to initiate possible detection algorithms. For example, powering on the laptop 106, plugging the laptop 106 into power, placing the laptop 106 into a docking station, switching subnets, etc may be used to cause the laptop to initiate detection algorithm detecting an appropriate proximity.

The In yet another alternative embodiment, a session may be established, and proximity determined, manually. For example the desktop computer 102 and/or the laptop computer 106 may include an icon for executing computer executable instructions causing the desktop computer 102 and laptop computer 106 to establish a session for extending the display information of the desktop computer 102 to the laptop computer 106. A user manually selecting the icon will cause an appropriate session to be established.

As explained previously, various security issues should also be taken into account when establishing terminal sessions. In one embodiment, various authentication steps are taken to ensure the security of a session between the desktop computer 102 and a laptop computer 106. For example, in one embodiment a wizard construct may be used to establish a secure session between the desktop computer 102 and the laptop computer 106. Once a user desires to create a session between the desktop computer 102 and the laptop computer 106, executable instructions may be executed on the desktop computer 102 which cause a security code, such as for example a 16 bit secret number, to be displayed on the desktop computer 102. A graphical user interface construct at the laptop computer 106 may prompt the user for the code on the desktop computer 102. The user can then type this security code into the graphical user interface on the laptop computer 106. This provides a reasonable assurance that the desktop computer 102 and the laptop computer 106 are in close sight proximity and gives a reasonable assurance that a particular user intends to create a session between the desktop computer 102 and a laptop computer 106. In one embodiment, a limited number of tries for entering the code on the laptop computer 106 may be implemented. This can be used as extra security to prevent a rouge user from simply entering all possible combinations until a session is established.

In one embodiment, once the user has entered the security code into the laptop computer 106, then the laptop computer 106 can use the code to obtain a security certificate from the desktop computer 102 which can be used to establish and carry out subsequent sessions. Security certificates can be used to establish a higher level of security than would ordinarily be available just using a simple security code. Embodiments allow, for example, sessions to be created using secure connections such as secure socket layer (SSL) tunnels.

While the examples illustrated herein have been shown using a desktop computer 102 and a laptop computer 106 it should be appreciated that other embodiments may also be used within the scope of the various embodiments recited in the claims herein. For example, the display information from a terminal server may be extended onto any one of the number of terminal clients including as already illustrated laptop computers, personal digital assistants (PDAs), other mobile devices etc. In addition, in one embodiment a desktop computer may also be used as the terminal client such that display information from a proximate terminal server may be extended onto the display of a desktop computer acting as a terminal client. In particular, certain individuals have used and need for side by side desktop computer systems. In one embodiment each of the side by side desktop computers may include a terminal server in the terminal client. Thus, depending on the need of the user, either computer may extend display information to the display of the other computer. Additionally, although a single terminal client has been illustrated herein, it should be appreciated that multiple terminal clients may be used allowing for the addition of a number of different displays for extending display functionality of the terminal server. Notably, the terminal server may also be embodied as any appropriate computing device including a desktop computer, laptop computer, PDA, or other computing device.

Various other technical issues may be addressed by embodiments described herein. One technical issue addressed by some embodiments relates to screen savers on both the terminal server and the terminal client. For example, in the example shown in FIG. 2, if the laptop computer 106 does not receive user input as will be common when the laptop 106 is only being used for its display functionality, the screen saver of the laptop 106 may be activated thereby preventing a user from viewing the graphics information sent from the desktop computer 102 to the laptop computer 106 for extending the display of the desktop computer 102. One method of preventing the screen saver of the laptop computer 106 is to programmatically cause the terminal client software to prevent the screen saver from activating. Because of the possible security implications of this functionality, in some embodiments, a user may allowed to choose whether or not to have this behavior. Alternatively, fake mouse movements can be periodically injected from the terminal client application. In one embodiment, the application may direct a mouse movement from the current mouse position to the current mouse position which will disable the screen saver if done frequently enough. Thus, no actual mouse movement is performed. Rather, a message is simply sent that a mouse movement has occurred. In some embodiments, the terminal server may direct the terminal client when to inject mouse movements.

Another technical issue that may be addressed is relates to screen savers on the terminal server. For example, in one embodiment, if the terminal server, in this case the desktop computer 102, has the screen saver become active this will cause the screen saver on the terminal client, in this case the laptop computer 106, to also become active. This allows for password protected screen savers to protect both the desktop computer 102 and the laptop computer 106. Using this approach, a user would need to unlock both the desktop computer 102 and the laptop computer 106 to resume use of the extended display functionality.

In an alternative embodiment, when the screen saver is activated on the desktop computer 102, the laptop computer 106 remains programmatically unlocked. However, if there is any actual mouse movement or keyboard control on the laptop computer 106, the laptop computer 106 will immediately have the screen saver activated thus securing the laptop computer 106. This would essentially render the laptop computer 106 locked, but would allow the desktop computer 102 when unlocked, to programmatically unlock the laptop computer 106, assuming that the laptop computer's screen saver timeout has not already been reached.

A related technical issue relates to allowing a user to utilize the functionality of the laptop computer 106. In one embodiment, actual mouse movements at the laptop computer 106 can be used to interrupt or disconnect the terminal session. The user can then be given access to programs and data stored at the laptop computer 106. Notably, to distinguish from the injected mouse movements to prevent activation of the screen saver described above, the mouse movements that allow access to the functionality of the laptop computer 106 may be required to move an actual distance rather than from one location to the same location as in the example above where a current mouse position is re-injected.

Yet another technical issue relates to the instantiation of the dummy display driver 208. As noted previously, in one embodiment, the dummy display driver 208 is not associated with any particular video hardware in the desktop computer 102. This presents various challenges that may be addressed. For example, one challenge relates to when to actually instantiate the dummy display driver 208. In one embodiment, instantiating the dummy display driver 208 includes configuring a new monitor in a display control panel such that is shows up in the display control panel as an active monitor. In one embodiment, when a user desires to extend display functionality, the user can manually add the dummy display driver 208 using a graphical user interface. The graphical user interface may be included as part of a display control panel graphical user interface, as part of a specialized graphical user interface specially designed for the display extension functionality, or in any other appropriate fashion. Adding of the dummy display driver 208 may also be automatic without user intervention. For example, the desktop computer 102 and laptop computer 106 may be configured to automatically instantiate a terminal session when some condition is met, such as for example, some condition related to proximity as discussed previously herein. When the condition is met, and during the process of establishing a terminal session, a dummy display driver may be instantiated automatically. In one embodiment, the dummy display driver 208 may be instantiated using plug and play APIs (application programming interfaces) so that dummy display drivers 208 may be instantiated on-the-fly without the need to re-boot the desktop computer 102.

Another technical issue that may be addressed relates to when the client is disconnected from a terminal session and no longer available as extended display space. Even though the client has been disconnected, there is some clean-up related to the dummy display driver 208. Without a physical display correlated to the dummy display driver, application windows assigned to the dummy display driver may not be viewable. Thus in one embodiment, instances of the dummy display driver 208 can be removed manually using a graphical user interface, or automatically when the end of the terminal session is detected. This results in the application windows that were assigned to the dummy display driver being re-assigned to the local display driver 206 where they can be displayed on the local display 110.

Figure 3:
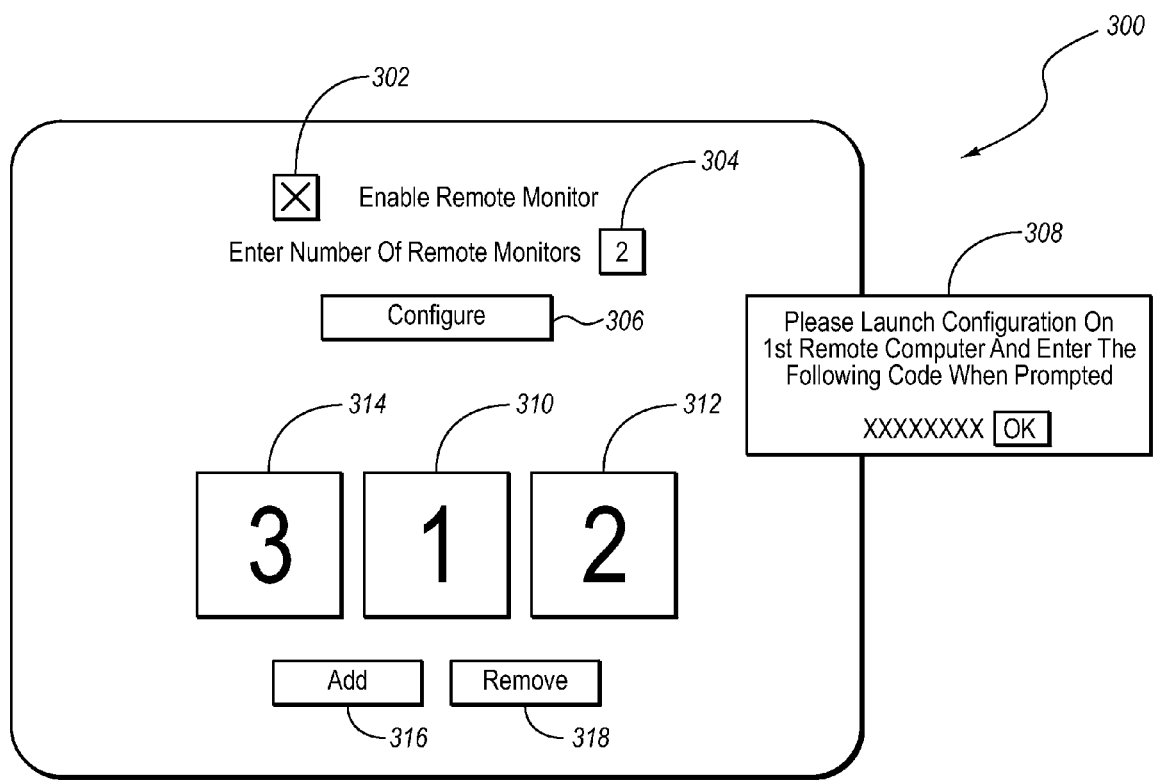
FIG. 3 illustrates a graphical user interface that may be used in one embodiment to configure computing device for extending graphics.

Referring now to FIG. 3, a graphical user interface (GUI) 300 is illustrated. The GUI 300 may be implemented on a terminal server. The GUI 300 is only exemplary and may be embodied as one or more different windows including one or more user selectable elements such as check boxes, radio buttons, buttons, text boxes, and the like. In one embodiment, the GUI 300 is integrated into the display control panel of the operating system, such that one accesses the same configuration GUI to either configure monitors actually connected to a computing device, or to configure monitors connected as remote extensions to the computing device. In the example shown, the GUI includes a user selectable element 302 which allows a user to enable remote display extension. In one embodiment, the user can also enter a number of remote displays to enable as illustrated in the user selectable element 304. The user can then select a configure user selectable element 306 to indicate a desire to configure terminal clients for use in extending the display of the terminal server. In the example shown, when the user desires to configure terminal clients, a wizard interface 308 may be sequentially invoked for each terminal client. In the embodiment shown, the wizard interface prompts the user to launch a configuration tool on a remote client and to enter a secret code as was explained in more detail above. A GUI can be displayed on remote clients that allows for the entry of the secret code. In one embodiment, the remote computer may implement various security features, such as a limited number of tries for the code, to prevent malicious attacks and attempts to create an unwanted session.

Once a number of terminal clients have been configured, the GUI 300 may also include a listing of configured terminal clients. Thus if reconfiguration is desired, a user can select a particular terminal client to reconfigure by selecting a terminal client from the list.

Notably, while the client has been referred to herein as remote, remote does not necessarily have a distance connotation. For example, a laptop computer may be directly adjacent a desktop computer and still be remote from the desktop computer. Additionally, while the example illustrated here shows a configuration wizard interface 308 that is instantiated sequentially for each remote client, other configurations may also be implemented.

The GUI 300 further illustrates various positioning user selectable elements. For example, the GUI 300 includes 3 graphical elements 310, 312, and 314 that represent local and remote displays. These may be moved and configured to represent the placement of displays with respect to each other so as to facilitate intuitive cursor movements and window movements for a user. Additionally, Add 316 and remove 318 elements are included so that a display may be added or removed. Adding and removing a display can, in one embodiment, be used to determine when a dummy display driver 208 (FIG. 2) is instantiated or removed.

Figure 4:
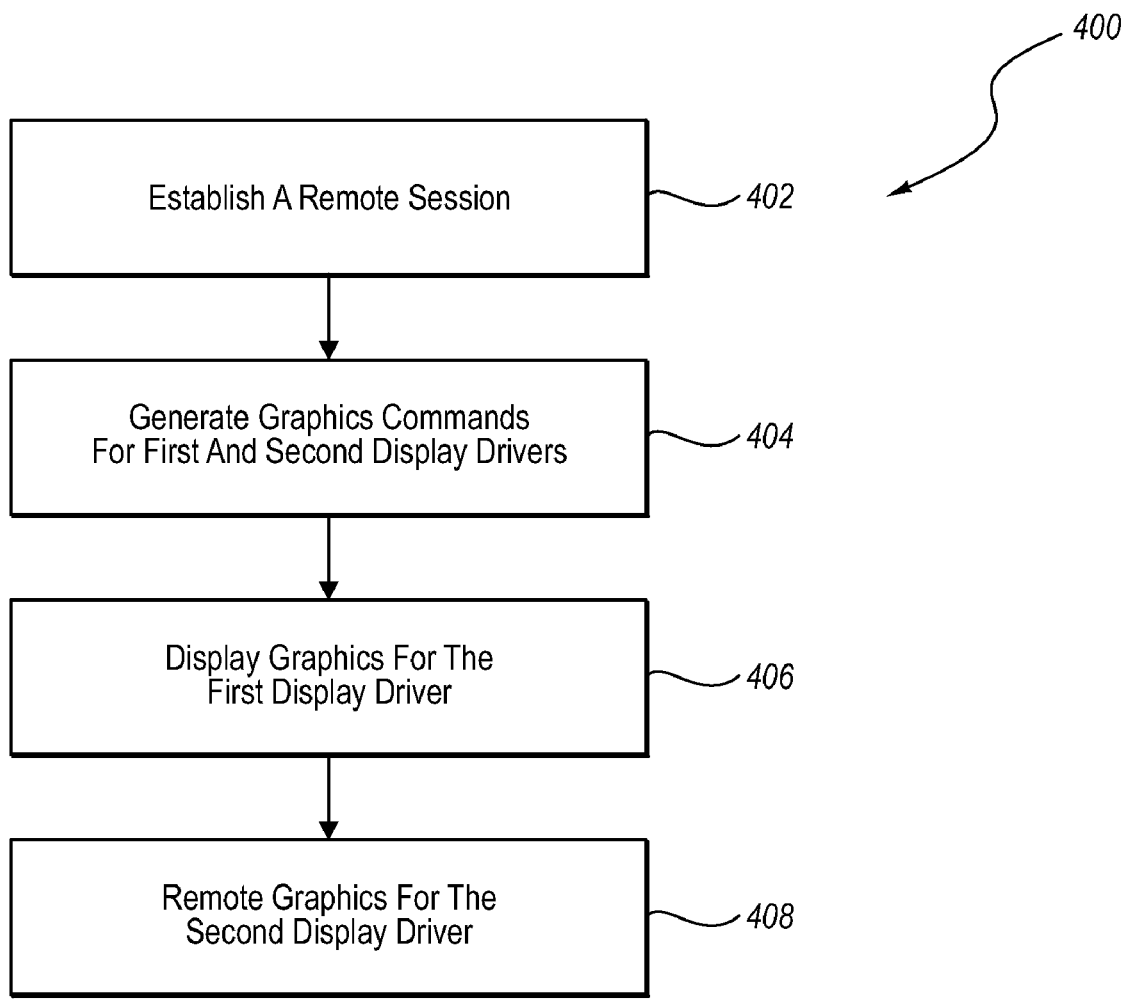
FIG. 4 illustrates a method for remoting graphics to a remote display.

Referring now to FIG. 4, a method 400 is illustrated that may be used in practicing one embodiment. The method 400 may be practiced, for example, in a computing environment including a number of computing devices including displays. The method includes acts for extending the desktop from a first computing device onto a display of a second computing device such that a multiple monitor configuration can be implemented for the first computing device where the multiple monitors include a display connected to the first computing device and one or more displays connected to other computing devices. The method 400 includes an act of establishing a remote session (act 402). For example, and referring to FIG. 2, the desktop computer 102 may establish a remote session with the laptop computer 106.

The method 400 further illustrates an act of generating graphics commands for first and second display drivers (act 404). Once again, FIG. 2 illustrates a GDI that may generate graphics commands for the local display driver 206 and the dummy display driver 208. Notably, the second display driver does not have an associated display at the computing device where the graphics commands are generated.

The method 400 further illustrates an act of displaying graphics for the first display driver (act 406). As shown in FIG. 2, graphics can be displayed locally at the local display 110.

The method 400 further illustrates an act of remoting graphics for the second display driver (act 408). FIG. 2 illustrates that the remote display driver 212 remotes graphics information to the laptop computer 106.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a plurality of computing devices including displays, a method of extending the desktop from a first computing device onto a display of a second computing device such that a multiple monitor configuration can be implemented for the first computing device where the multiple monitors include a display connected to the first computing device and one or more displays connected to other computing devices, the method comprising:

establishing a remote session between the first computing device and the second computing device, wherein a remote session may include a session of two computing devices that are in close proximity;

generating graphics commands for first and second display drivers at the first computing device as if a multi-display configuration was active at the first computing device, the first display driver being associated with a display at the first computing device, and the second display driver not having an associated display at the first computing device, wherein a dummy driver of the first computing device is used to indicate that multiple displays are attached to the first computing device;

displaying graphics from the graphics commands for the first display driver at the display at the first computing device; and remoting graphics commands for the second display driver to the second computing device and not displaying graphics from graphics commands for the second display driver at the first computing device, such that a display at the second computing device acts as an extension of the display at the first computing device.

2. The method of claim 1, wherein the second display driver does not correspond to actual video hardware at the first computing device.

3. The method of claim 1, wherein the second computing device is a mobile device such as a laptop or PDA.

4. The method of claim 1, wherein establishing a remote session between the first computing device and the second computing device comprises establishing a shadowing session.

5. The method of claim 4, wherein establish a remote session between the first computing device and the second computing device further comprises disabling warnings to the first computing device indicating that the second computing device is shadowing the first computing device.

6. The method of claim 1, wherein establishing a remote session between the first computing device and the second computing device comprises establishing a collaboration session.

7. The method of claim 1, wherein establishing a remote session between the first computing device and the second computing device comprises establishing a remote session in response to an event including at least one of detection of a Bluetooth partnership, detection of proximity within a predetermined proximity of the first and second computing devices, detection that the first and second computing devices are on the same subnet, or detection of selection of an icon.

8. The method of claim 1, wherein establishing a remote session between the first computing device comprising instantiating the second display driver as a dummy display driver in the first computing device.

9. The method of claim 1, further comprising ending the remote session including removing the second display driver and repositioning application windows corresponding to the second display driver to the at the display at the first computing device.

10. The method of claim 1, wherein establishing a remote session between the first computing device and the second computing device comprises displaying a secret code on the display at the first computing device and prompting a user to enter the secret code on the second computing device.

11. The method of claim 1, wherein establishing a remote session between the first computing device and the second computing device comprises establishing a secure session between the first computing device and the second computing device.

12. The method of claim 1, wherein establishing a remote session between the first computing device and the second computing device comprises receiving resolution and color depth information from the second computing device and configuring the second display driver to have the same resolution and color depth as the information received from the second computing device.

13. In a computing environment comprising a plurality of computing devices including displays, a method of extending the desktop from a first computing device onto a display of a second computing device such that a multiple monitor configuration can be implemented for the first computing device where the multiple monitors include a display connected to the first computing device and one or more displays connected to other computing devices, the method comprising:
- establishing a remote session between the first computing device and the second computing device, wherein a remote session may include a session of two computing devices that are in close proximity;
- receiving, at the second computing device graphics commands for a dummy display driver at the first computing device, the dummy display driver not having an associated display at the first computing device, wherein the dummy driver of the first computing device is used to indicate that multiple displays are attached to the first computing device; and
- displaying graphics from the graphics commands for the dummy display driver at the display at the second computing device, and not displaying graphics from graphics commands for the dummy display driver at the first computing device, such that a display at the second computing device acts as an extension of the display at the first computing device.

14. The method of claim 13, further comprising sending information about the resolution and color depth of the display at the second computing device.

15. The method of claim 13, wherein graphics from graphics commands for a first display driver corresponding to a display device at the first computing device and graphics from the graphics commands for the dummy display driver at the display at the second computing device are stitched together to form a single image, the method further comprising zooming to a portion of the displayed graphics corresponding to a portion of the graphics for the dummy display driver when graphics information for both the first display driver corresponding to the display at the first computing device and the dummy display driver are received at the second computing device.

16. The method of claim 13, further comprising injecting fake mouse movements, wherein an application directs a mouse movement from a current mouse position to the current mouse position, thus causing no actual mouse movements to prevent activation of a screen saver on the second computing device.

17. In a computing environment comprising a plurality of computing devices including displays, a method of extending the desktop from a first computing device onto a display of a second computing device such that a multiple monitor configuration can be implemented for the first computing device where the multiple monitors include a display connected to the first computing device and one or more displays connected to other computing devices, the method comprising:
- displaying a graphical user interface as at least a portion of a display settings control panel at a first computing device including one or more user selectable elements allowing a user to indicate a desire to establish a remote session for extending graphics information to a display on a second computing device;
- receiving user input at the one or more user selectable elements indicating that the user desires to establish a remote session;
- establishing a remote session between the first computing device and the second computing device, including instantiating a dummy display driver for the second computing device, wherein no display at the first computing device is associated with the dummy display driver, wherein the dummy driver of the first computing device is used to indicate that multiple displays are attached to the first computing device;
- remoting graphical information corresponding to the dummy display driver to the second computing device and not displaying graphics from the graphical information corresponding to the dummy display driver such that a display at the second computing device acts as an extension of a display at the first computing device.

18. The method of claim 17, wherein establishing a remote session between the first computing device and the second computing device comprises displaying a secret code to the user and prompting the user to enter the secret code on the second computing device.

19. The method of claim 17, further comprising displaying user selectable elements that allow the user to add additional remote computing devices for use as remote displays.

20. The method of claim 17, further comprising displaying user selectable elements that allow the user to select remove remote session displays.

* * * * *

UNITED STATES PATENT AND TRADEMARK OFFICE
CERTIFICATE OF CORRECTION

| | | |
|---|---|---|
| PATENT NO. | : 7,633,483 B2 | Page 1 of 1 |
| APPLICATION NO. | : 11/426750 | |
| DATED | : December 15, 2009 | |
| INVENTOR(S) | : Ido M. Ben Shachar et al. | |

It is certified that error appears in the above-identified patent and that said Letters Patent is hereby corrected as shown below:

Title Page, Item (75), "Inventor" delete "Ido M. Ben Schachar" and insert -- Ido M. Ben Shachar --, therefor.

Signed and Sealed this
Eighth Day of February, 2011

David J. Kappos
*Director of the United States Patent and Trademark Office*